United States Patent [19]

Vaughn

[11] B 3,997,500

[45] Dec. 14, 1976

[54] PROCESS AND COMPOSITION FOR WATER- AND OIL-PROOFING TEXTILES

[75] Inventor: Walter L. Vaughn, Lake Jackson, Tex.

[73] Assignee: The Dow Chemical Company, Midland, Mich.

[22] Filed: Aug. 15, 1974

[21] Appl. No.: 497,780

[44] Published under the second Trial Voluntary Protest Program on February 24, 1976 as document No. B 497,780.

Related U.S. Application Data

[63] Continuation-in-part of Ser. No. 242,747, April 10, 1972, abandoned, which is a continuation-in-part of Ser. No. 10,008, Feb. 9, 1970, abandoned.

[52] U.S. Cl. .............. 260/33.8 UA; 260/33.6 UA
[51] Int. Cl.² .......................................... C08K 5/02
[58] Field of Search ............ 260/33.8 UA, 80.8, 64, 260/67 PP, 88.1 PC

[56] References Cited

UNITED STATES PATENTS

| | | | |
|---|---|---|---|
| 2,803,615 | 8/1957 | Ahlbrecht et al. | 260/79.3 M UX |
| 3,147,066 | 9/1964 | Brown et al. | 8/115.5 X |
| 3,378,609 | 4/1968 | Fasick et al. | 260/890 |
| 3,523,930 | 8/1970 | Maloney | 260/80.8 |

*Primary Examiner*—Lewis T. Jacobs
*Attorney, Agent, or Firm*—L. S. Jowanovitz

[57] ABSTRACT

An improved process and composition for water- and oil-proofing textiles which comprises treating a textile with a polymeric fluorocarbon finishing agent and at least one reactive polymer extender of the formula

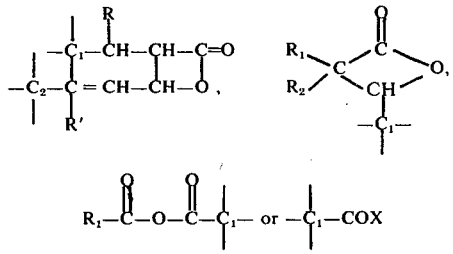

and curing the treated textile at from 80° to 170° C for 0.1 to 60 minutes; wherein $C_1$ and $C_2$ are carbon atoms of a polyalkylene copolymer chain, R and R' are hydrogen, alkyl, phenyl, —COOH or a segment of a polyalkylene chain, $R_1$ and $R_2$ are alkyl, aryl, aralkyl, alkaryl, or the like, of up to about 20 carbon atoms, and X is a halogen. The treatment in accordance with the present invention results in synergistic improvements in the oil- and/or water-repellent properties of the conventional fluorocarbon agents.

6 Claims, No Drawings

PROCESS AND COMPOSITION FOR WATER- AND OIL-PROOFING TEXTILES

CROSS-REFERENCE TO RELATED APPLICATION

The present application is a continuation-in-part of my previous application Ser. No. 242,747 filed Apr. 10, 1972, now abandoned, which is a continuation-in-part of Ser. No. 10,008 filed Feb. 9, 1970, now abandoned.

BACKGROUND OF THE INVENTION

The treatment of textiles with fluorocarbon chemicals to impart water- and oil-repellency has been known to the art for several years. Certain fluorocarbon extenders, i.e., compounds which increase the properties imparted by the finishing agent, such as triazine resins, chloromethylated quaternary ammonium compounds and the like are generally used to improve the water-repellency at low add-on levels of the fluorocarbon finishing agent. However, such improvements on oil-repellency are rare and highly restricted.

Some of the publications which attest to the widespread use of fluorocarbons as oil- and/or water-repelling agents are:

*Fluorine Chemistry*, Vol. V, pp. 396–417, edited by J. H. Simons, published by Academic Press, 1964;

*Waterproofing and Water-Repellency*, pp. 124–135, pp. 212–216, p. 243, and p. 260, edited by J. L. Moilliet and published by Elsevier Publishing Company, 1963;

*Encyclopedia of Chemical Technology*, Kirk-Othmer, Vol. 22, pp. 145–146 of second revised edition, published by John Wiley & Sons, Inc.

SUMMARY OF THE INVENTION

It has now been found that the oil- and/or water-repellent properties of conventional fluorocarbon finishing agents may be extended, i.e., similar properties may be achieved using smaller quantities of the expensive finishing agent when employed with the polymeric extenders disclosed herein.

In accordance with the present invention, a textile is treated with a fluorocarbon finishing agent and one or more reactive polymeric extenders and cured at from about 80° to about 170°C. for 0.1 to 60 minutes.

The reactive polymers which have been found to synergistically extend the repellency of the fluorocarbons may be one or more polyalkylene copolymers containing groups of the formulae

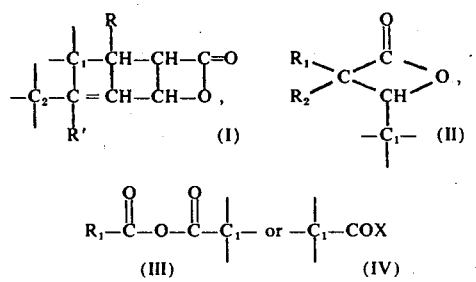

wherein $C_1$ and $C_2$ are, independently, carbon atoms of the polyalkylene chain, R and R' are, independently, hydrogen, alkyl groups of up to about 20 carbon atoms, phenyl, —COOH or a segment of the polyalkylene chain, $R_1$ and $R_2$ are, independently, alkyl, aryl, aralkyl, alkaryl, or the like, of up to about 20 carbon atoms, and X is a halogen. The expression "polyalkylene chain" refers to the chain of carbon atoms which constitute the polymer "backbone", said chain being essentially a series of alkylene groups which can be illustrated by

where $n$ is an integer such as to provide a mol. wt. of at least about 800.

DETAILED DESCRIPTION OF THE INVENTION

Process

The process of the instant invention may suitably be carried out in the following manners, other variations being obvious to those skilled in the art.

1. a reactive or polar fiber is treated with the composition of this invention in a number of well-known ways, such as, for instance, dipping, padding, spraying and the like. It is required that the copolymer extender be applied either first or in combination with the fluorocarbon repellent, i.e., results are not satisfactory if the fluorocarbon is applied prior to the extender.

It is suitable to treat the fiber with from about 10 to about 100 weight percent wet pick-up of the total composition, 40 to 80 weight percent being preferred.

The composition is suitably a substantially inert anhydrous solvent which contains from about 0.1 to about 10 weight percent (preferably 0.2 to 5 weight percent) of a fluorocarbon repellent, and from about 0.3 to about 10 weight percent (preferably 0.5 to 6 weight percent) of one or more of the reactive polymer extenders.

2. The excess solvent may then be removed by, for instance, using heat and/or gaseous flow, or simultaneously removed during step (3) below.

3. The treated fiber is subjected to a brief thermal cure to cross-link the polymer extender.

The above process, then, may suitably be carried out in three ways: (1) The textile is treated with the polymer extender, the solvent removed and the treated textile subjected to conditions which will cure the extender, as set out above. The finishing agent may then be applied, the solvent removed and the textile again subjected to proper curing conditions. (2) The texile may be treated with a combination of the repellent and the extender, the solvent removed and the combination cured. And, (3) the textile may be treated with the extender, the solvent removed, the textile then treated with the repellent, the solvent removed and the combination cured. In this last operation, i.e., (3), the time between the initial treatment with the extender and the treatment with the repellent is controlled by the amount of hydrolysis which may occur with regard to the reactive groups on the polymer extender, said hydrolysis deactivating some of these sites.

The reactive or polar textile fibers which are amenable to this method include cotton, wool, cotton-wool blends, dacron, rayon, nylon, silk and other reactive natural and synthetic fibers and their blends.

Solvents which are suitable in the method of this invention, as well as in the polymeric extenders, as taught below, include chlorinated hydrocarbon solvents, such as 1,1,1-trichloroethane, perchloroethylene, ethylene dichloride, methylene chloride, o- dichlorobenzene and the like; other organic solvents such as benzene, toluene, dioxane, xylene, heptane and higher aliphatics; alkyl acetates; tetrahydrofurane; fluorohalocarbons such as trichlorofluoromethane, trifluorotrichloroethane, dibromotetrafluoroethane, tetrachlorodifluoroethane and those fluorohalocarbons which are suitable for use herein for aerosol applications; and mixtures of the above. Preferred solvents include perchloroethylene and 1,1,1-trichloroethane.

Fluorocarbon Repellents

Fluorocarbon chemical compounds which are generally suitable as oil- and water-repellents are those polymeric materials which have a polar head (to interact with the reactive fiber) and a fluorocarbon non-polar tail (which is both oleophobic and hydrophobic, thereby imparting stain resistance to both organic compounds, such as oils, and water).

The above compounds are generally referred to as fluorocarbon chemicals, fluorocarbon finishing agents, polymeric fluorocarbons, fluorochemical finishing agents and fluorocarbons. These terms are used interchangeably herein, all of them referring to polymeric fluorocarbon chemicals which are useful in inparting oil-, water-, and stain-repellency to substrates, such as textiles. Many of the fluorocarbon chemicals are represented by the generic formulae as follows:

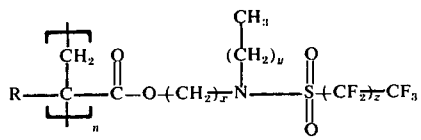

where R is hydrogen or methyl.

Fluorocarbon chemicals may be prepared according to one or more of the following U.S. Pat. Nos. 2,803,615, 2,809,990, 2,995,542, 2,732,398, 2,803,656, 3,171,861, 3,147,064, 3,147,065, 3,248,260, 3,147,066, and 3,282,905.

For example, U.S. Pat. No. 2,803,615 shows the preparation of fluorocarbon acrylate (and methacrylate) esters and polymers thereof. The polymers have the recurring ester unit

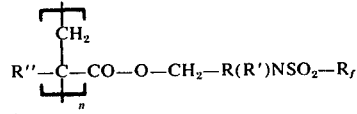

where $R_f$ is a perfluoroalkyl group containing 4 to 12 carbon atoms, $R'$ is an alkyl side chain having 1 to 6 carbon atoms, R is an alkylene group containing 1 to 12 carbon atoms, and $R''$ is hydrogen or a methyl group.

U.S. Pat. No. 2,809,990 shows the preparation of fluorocarbons which can be depicted as $$C_nF_{2n+1} - SO_2N(R') - CH_2 - CO - OH$$

which, through the reactive OH group, can be reacted to yield polymerizable monomers.

U.S. Pat. No. 2,995,542 shows the preparation of polymeric structures containing recurring groups which can be depicted as

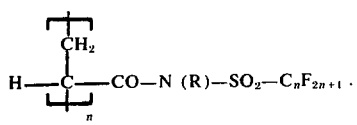

Commercially available formulations useful in treating substrates to impart resistance to water, oil and stains and which utilize, as their principal ingredient, fluorocarbon chemicals such as illustrated above are, e. g., FC-205, FC-208, FC-218, FC-310, FC-319, Zepel S. Those which have "FC" designations are of the Scotchgard brand variety, a trademark of Minnesota Mining & Manufacturing. Zepel S is a trademark of E. I. duPont de Nemours & Company.

Polymeric Extenders

The polymeric extenders useful in the method and compositions of this invention include those of Formulae I, II, III and Iv as defined above and their mixtures. Suitable are those polymers with molecular weights of from about 800 to about 8000, preferably 1000 to 6000.

The polymeric extenders of the present invention, being of relatively low molecular weight (viz. about 800 to about 8000), are too fluid at 190°C to be melt indexed under standard ASTM conditions (ASTM-1238-65T Condition E). Under such standard conditions, the melt index, if it could be so-measured, would be several thousand decigrams/minute. In an attempt to measure the melt flow of the present copolymers as a "melt index" it is necessary to modify the standard ASTM test by using a lower temperature, smaller orifice and/or less weight.

By way of example, a copolymer useful as a precursor polymer in the present invention comprising 61.6% ethylene, 21.7% propylene, and 16.7% acrylic acid when tested under standard ASTM conditions except for varying the temperature exhibits the following melt indexes.

| Melt Index (Melt flow in decigrams/min.) | Temperature in °C of melt |
| --- | --- |
| 25 | 40 |
| 60 | 45 |
| 100 | 50 |
| 210 | 55 |
| 360 | 60 |
| 1300 | 70 |

By extrapolation, it is seen that the melt index of the same polymer, if it were possible to measure at 190°C, would by many thousand. Thus it is seen that the "Standard ASTM" test for melt index is not suitable as a means for estimating mol. wt. of low mol. weight copolymers such as are used in the present invention. The same copolymer identified above is found to have a peak mol. wt. of about 1600 when measured by gel permeation chromatography (see e.g. J. Polymer Sci. A., 2, (1964) for GPC analysis method).

The various precursor polymers utilized to prepare the polymeric extenders utilized herein are known to the art, generally being modified or non-modified olefin/acid or olefin/acid halide polymers. They may be prepared according to a number of U.S. patents including U.S. Pat. Nos. 3,441,545, 3,310,518, 3,361,842 and 3,413,272.

They are typically prepared by polymerizing an alpha olefin, such as ethylene and/or propylene, with an alpha-, beta-ethylenically unsaturated carboxylic acid, in the presence of a catalyst and under superatmospheric pressure. These polymers may then be modified to, for instance, acid halides, esters, amides and the like. They may be prepared from one or more monomers which are well known in the art, including such compounds as alkenes and alkadienes, such as ethylene, propylene, butene, isobutene, pentene, hexene, octene, butadiene, isoprene, etc., (the term alkenes is intended to also include cycloalkenes, such as cyclohexene), unsaturated esters, such as acrylate- and methacrylate-containing monomers, such as alkyl and cycloalkyl (1 to 20 carbon atoms) acrylates and methacrylates, such as methyl methacrylate, ethyl acrylate, t-butyl acrylate, 2-ethylhexyl methacrylate, cyclohexl acrylate and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylonitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated and brominated derivatives of the above.

The reactive polymeric extenders, then, are prepared from the above precursors by different routes depending upon the nature of the reactive group, said groups being represented by Formulae I through IV above. Each type will be discussed separately with respect to its preparation and properties.

A. β-LACTONE-CONTAINING POLYMERS OF FORMULA I

Polyalkylene copolymers containing interlinking beta-lactone groups of the formula

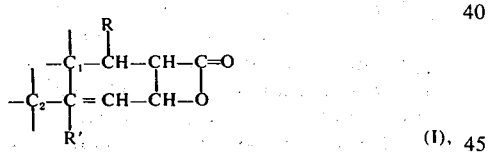

are prepared by treating an olefin-alkylene carboxylic acid copolymer halogenated so as to contain at least one group of the formula

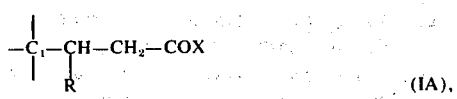

with a tertiary amine to interlink at least two segments of said copolymers through a beta-lactone group of Formula (I), wherein $C_1$ and $C_2$ are, independently, carbon atoms of the polyalkylene chains, R and R' are, independently, hydrogen, alkyl groups of up to about 20 carbon atoms, phenyl, —COOH or a segment of the polyalkylene chain and X is a halogen such as chlorine or bromine.

The precursor olefin/carboxylic acid copolymer may be derived as described above. There is a requirement, however, that the monomers used to prepare said precursor polymers contain at least about 4 to 5 weight percent based on total starting polymer of one or more monomers which will result in, or may be modified to, one or more groups pendant from, or terminal to, the polymer backbone, said groups being of Formula (IA) above.

Examples of said monomers include acrylic acid, itaconic acid, cinnamic acid, crotonoic acid, 3-butenoic acid, 4-pentenoic acid, 3-pentenoic acid, 5-hexenoic acid, 4-hexenoic acid, 3-hexenoic acid, and the like, and the acid halides thereof.

It is to be noted that $C_1$ and $C_2$ may be carbon atoms in a single polymer chain, thereby resulting in a "cyclic" polymer.

These copolymers, then, may suitably be prepared by contacting about 0.005 to 20.0 weight percent (preferably 1.0 to 2.0 weight percent) of the acid halide-containing polymer in a suitable inert solvent with agitation and under anhydrous conditions at no more than about 60° C (preferably 20 to 30° C), with a tertiary amine compound. The beta-lactone-containing polymer results.

Tertiary amines which are suitable include trialkyl and triaralkyl amines, such as trimethylamine, triethylamine, triisopropylamine, diethylmethylamine, ethylmethylpropylamine and tribenzylamine, tertiary cyclic amines, such as N-ethylpiperidine, N-isopropylpiperidine, N-methylhexahydroazepine, N-ethylpyrrolidine, and tertiary polyalkylenepolyamines, such as N,N'-diethyl-N,N'-dimethylethylenediamine.

It is to be noted that the amount of residual acid halide groups desired on the beta-lactone-containing polymer, if any, will dictate the amount of tertiary amine to be utilized. It it is desired to lactonize all, or substantially all, the above groups, generally a slight excess over equivalency is to be utilized. Generally from about 1 to 100 amine equivalents per acid halide equivalent are suitable, while 3 to 5 are preferred.

Pressure is not a critical variable in the lactonization process taught herein, and may suitably be super-, sub- or atmospheric pressures.

It is to be noted that these beta-lactone-containing polymers will generally cross-link in storage when the concentration of said polymer in solvent exceeds about 4 to 6 weight percent. However, the polymers may be made in concentrations of up to 20 weight percent and then diluted. Even if partial cross-linking occurs, the remaining reactive groups may be utilized as taught herein. Also, heating the solution above about 60° C. for a period of time in excess of about one hour will also result in cross-linking. Further, addition to the solution of a non-solvent (such as acetone, pentane and the like) may cause a concentration of the polymer in excess of the above tolerable limits, thereby resulting in at least some cross-linking.

For further details regarding this particular polymer, see copending application Ser. No. 11,361, entitled REACTIVE BETA-LACTONE-CONTAINING POLYMERS AND A METHOD FOR THEIR PREPARATION, filed Feb. 9, 1970 now U.S. Pat. No. 3,687,909.

B. β-LACTONE-CONTAINING POLYMERS OF FORMULA II

Polyalkylene copolymers containing beta-lactone groups of the formula

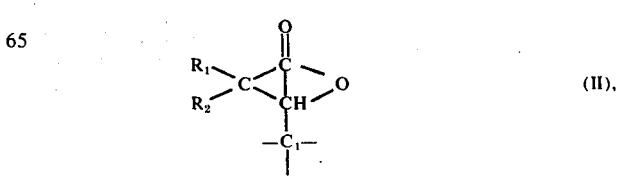

are prepared by treating a polyalkylene copolymer containing at least one group of the formula

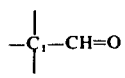　　(IIA), with a ketene of the formula

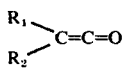　　(IIB), to form one or more beta-lactone groups of Formula (II), wherein $C_1$ is a carbon atom of the polyalkylene chain, and $R_1$ and $R_2$ are, independently, hydrogen or aryl, alkyl, alkaryl, aralkyl or like groups of up to about 20 carbon atoms.

The precursor polyalkylene copolymer may, as in A, be derived as described above. However, in this case, there is the requirement that the monomers used to prepare said precursor polymers contain at least one monomer group which will result in a group of Formula (IIA) above. Examples of said monomers include acrolein, methacrolein, crotonaldehyde, cinnamaldehyde, tigaldehyde, α-methylisocrotonaldehyde, 3-butenal, 3-methyl-2-butenal, β-methylcrotonaldehyde and the like.

The beta-lactone-containing polymers utilized in this invention, then, may suitably be prepared by reacting, at no more than about 60°C. (preferably 20° to 30°C.), 0.005 to about 20 weight percent (preferably 1 to 2 weight percent) of the -CHO group-containing polymer in a suitable solvent, with a ketene of Formula (IIB) above. The beta-lactone-containing polymer results.

Suitable ketenes include, for example, ketene, diphenyl ketene, dimethyl ketene, ethylbutyl ketene, diethyl ketene, phenylpropyl ketene, hexylphenyl ketene, isopropyl ketene, dibenzyl ketene, phenylethyl ketene, ethylmethyl ketene, methyl ketene, methylphenyl ketene and the like.

It is to be noted that the amount of residual aldehyde groups desired on the beta-lactone-containing polymer, if any, will dictate the amount of ketene to be utilized. If it is desired to lactonize all, or substantially all, the above groups, generally a slight excess over equivalency is to be utilized. Generally from about 0.5 to about 5 ketene equivalents per polymer aldehyde equivalent is suitable, while 1 to 3 is preferred.

Pressure is not a critical variable in the method of this invention and may suitably be sub-, super- or atmospheric.

The same cautions regarding storage as were taught in A apply to this polymer.

For further details regarding this particular reactive polymer, see copending application Ser. No. 11,362, entitled REACTIVE BETA-LACTONE-CONTAINING POLYMERS AND A METHOD FOR THEIR PREPARATION, filed Feb. 9, 1970 now U.S. Pat. No. 3,787,366.

C. ACID ANHYDRIDE-CONTAINING POLYMERS OF FORMULA III

Polyalkylene copolymers containing acid anhydride groups of the formula

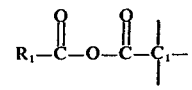　　(III), are prepared by treating an olefin-carboxylic acid copolymer which contains at least one group of the formula

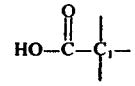　　(IIIA), with an acid anhydride of the formula

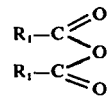　　(IIIB), to form at least one group of Formula (III), wherein each $R_1$ is, independently, an alkyl, aryl, aralkyl or like group of up to about 20 carbon atoms, and $C_1$ is a carbon atom of the polyalkylene chain.

The precursor olefin/carboxylic acid copolymer may once again, as in A and B, be derived as described above. However, in this case, there is the requirement that the monomers used to prepare the precursor polymers of this invention contain at least about 1 to 2 weight percent, preferably about 1 to about 45 weight percent, based on total starting polymer, of one or more monomers which will result in one or more groups pendant from, or terminal to, the polymer backbone, said groups being of Formula (IIIA) above.

Examples of said monomers include acrylic and methacrylic acids, itaconic acid, maleic acid, fumaric acid, ethyl acid maleate, cinnamic acid, crotonic acid, 3-butenoic acid, 4-pentenoic acid, 3-pentenoic acid, 5-hexenoic acid, 4-hexenoic acid, 3-hexenoic acid and the like.

These copolymers, then, may suitably be prepared by contacting from about 1.0 to about 80 weight percent (preferably about 20 to 60 weight percent) of the acid-containing polyalkylene copolymer in, optionally, a suitable inert anhydrous solvent, with at least about 1.0 equivalent (preferably 3 to 12 equivalents) of an acid anhydride per polymeric acid equivalent, said reaction to occur at a temperature of from about 10°C. to the boiling point of the anhydride, and preferably at the reflux temperature.

Suitable anhydrides are of Formula (IIIB) above, wherein each $R_1$ may be, independently, an alkyl or cycloalkyl group of up to about 20 carbon atoms, such as methyl, 1-propyl, amyl, cyclohexyl, octyl, dodecyl, 1-methyl-6, 9-ethyl-undecyl, stearyl and the like; aryls such as phenyl, naphthyl and the like; and alkaryls and aralkyls of up to about 20 carbon atoms, such as ethylphenyl, naphthlmethyl, phenylhexyl, hexylphenpropyl, diamylphenyl, dibutylnaphthyl and the like.

Acid anhydrides and mixed anhydrides of the following acids are, for example, suitable: acetic, propionic, butyric, valeric, capric, myristic, oleic, benzoic, toluic, naphthoic and the like. Preferred anhydrides include acetic, propionic, butyric, valeric and benzoic anhydrides.

Pressure is not a critical variable in the process of this invention and may suitably be sub-, super- or atmospheric.

Once again, the same cautions regarding storage as were taught in A apply to this polymer.

For further details regarding this particular polymer, see copending application Ser. No. 11,364, entitled METHOD FOR PREPARING MIXED ANHYDRIDE-CONTAINING POLYMERS, filed Feb. 9, 1970 now U.S. Pat. No. 3,631,156.

D. ACID-HALIDE-CONTAINING POLYMERS OF FORMULA IV

Polyalkylene copolymers containing acid halide groups of the formula $$-C_1-COX \qquad (IV)$$

are suitably those precursor polymers discussed under (A) above. Their preparation is detailed by those patents listed under *Polymeric Extenders*.

PREFERRED COMPOSITIONS

Preferred treating compositions include the following:

| Extender Type* | Extender Conc. by Weight | Solvent** | Fluorochemical Type*** | Fluorochemical Concentration By Weight (Add-on) |
|---|---|---|---|---|
| 1–14 | .5–6.0% | i or ii | A, B, or C | .2–4.0% |
| 1–14 | .5–6.0% | i | D | .5–5.0% |

*Polymeric Extenders

| Monomers Used | Wt. % Composition | Molecular Weight |
|---|---|---|
| 1. E/P/AAA | 45–82:0–40:18–25 | 1000–4500 |
| 2. E/P/MAAA | 45–82:0–40:13–25 | 1000–4500 |
| 3. E/P/VA/AAA | 20–81:0–40:1–15:18–25 | 1000–4500 |
| 4. E/P/VA/MAAA | 20–81:0–40:1–15:13–25 | 1000–4500 |
| 5. E/P/MMA/AAA | 20–81:0–40:1–15:18–25 | 1000–4500 |
| 6. E/P/MAA/MAAA | °–81:0–40:1–15:13–25 | 1000–4500 |
| 7. E/P/EA/AAA | 20–81:0–40:1–15:18–25 | 1000–4500 |
| 8. E/P/EA/MAAA | 20–81:0–40:1–15:18–25 | 1000–4500 |
| 9. E/P/MA/AAA | 20–81:0–40:1–15:18–25 | 1000–4500 |
| 10. E/P/MA/MAA | 20–81:0–40:1–15:18–25 | 1000–4500 |
| 11. E/P/MEMMAA | 15–79:0–40:20–30 | 1000–4500 |
| 12. E/P/BL | 40–90:0–40:10–20 | 2000–6000 |
| 13. E/P/IAA | 35–90:0–40:10–25 | 1000–4500 |
| 14. E/P/AC | 45–82:0–40:10–25 | 1000–4500 |

E = ethylene, P = propylene, AAA = acrylic acetic anhydride, MAAA = methacrylic acetic anhydride, VA = vinyl acetate, MMA = methyl methacrylate, EA = ethyl acrylate, MA = methyl acrylate, BL = beta-lactone pendant groups, MEMMAA = monoethylmaleate maleic acetic anhydride, IAA = itaconic acetic anhydride, AC = acrylyl chloride.

**Solvents
 i = 1,1,1-trichloroethane
 ii = perchloroethylene
***Fluorochemical Type

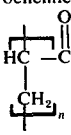

A = , which includes about 37% of formulation modifiers and aids such as softeners (polybutene).

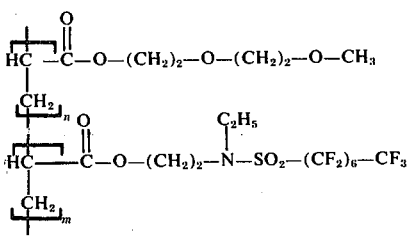

B =

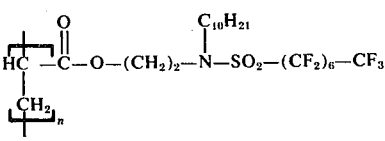

C =

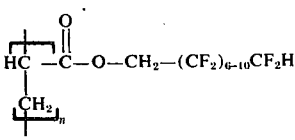

D =

Fluorochemical types A, B, and C are of the Scotchgard brand variety and type D is of the Zepel S brand variety. These are all commerically available formulations.

Other hand agents, softeners, sizes, antistatic agents, and the like, may be incorporated as desired.

SPECIFIC EMBODIMENTS

The general experimental procedure utilized for the process and compositions of this invention was as follows.

Controlled add-on of the composition was obtained by dipping 8 × 8 in. swatches of the designated fabric to 100% wet pick-up, and carefully measuring the volume of liquid employed in the treatment. The add-on levels, as stated in the following table, were then calculated from the weight of the fabric, the amount of solution added (1,1,1-trichloroethane being utilized in all cases as the solvent unless otherwise noted), and the concentrations of the finishing agent and polymeric extender present in the solution.

The treated fabrics were air-dried, oven-cured for the specified time and at the specified temperature, using an electric oven, then conditioned at 65% RH and 26°C. prior to testing.

Oil repellency is the ability of a textile fiber, yarn or fabric to resist wetting by oily liquids. In this test drops of standard test liquids consisting of a selected series of hydrocarbons with varying surface tensions were placed on the fabric surface and observed for wetting. The Oil Repellency Rating reported was the highest numbered test liquid which did not wet the fabric surface within the 30 second test period.

The liquids were placed, beginning with the lowest numbered test liquid (No. 1), on the fabric and if no penetration or wetting of the fabric occured within 30 seconds, the next highest numbered test liquid was placed on the fabric. This process was continued until one of the test liquids showed obvious wetting of the fabric under or around the drop within 30 seconds. The standard test liquids are shown below, along with the corresponding AATCC Oil Repellency Rating numbers.

| AATCC Oil Repellency Rating No. | Standard Test Liquids Composition |
|---|---|
| 1 | Mineral Oil |
| 2 | 65:35 Mineral Oil:n-Hexadecane, by volume (21°C.) |
| 3 | n-Hexadecane |
| 4 | n-Tetradecane |
| 5 | n-Dodecane |
| 6 | n-Decane |
| 7 | n-Octane |
| 8 | n-Heptane |

The Spray Test consisted of allowing a spray of water to fall onto the fabric, under controlled conditions, and comparing the effect with a standard chart. The resistance of the fabric to surface wetting was measured, without accounting for penetration. The results are rated numerically from 0 to 100 for surface wetting as described below.

100 — No sticking or wetting of the upper surface
90 — Slight random sticking or wetting of upper surface
80 — Wetting of upper surface at spray points
70 — Partial wetting of whole or upper surface
50 — Complete wetting of whole or upper surface
0 — Complete wetting of whole or upper and lower surfaces The following table shows a representative number of experiments and the results thereof. Each sample was run both with and without a polymeric extender, shown as "Ext." and "No Ext." respectively, for both oil- and water-repellency.

The polymeric extenders are keyed as follows, all % being by weight of total polymer.

| | |
|---|---|
| I. $E_{60-82\%}$ $P_{0-20\%}$ $AAA_{18-25\%}$, | Mol. wt. = 1700–2500 |
| II. $E_{78\%}$ $IAAA_{22\%}$ | Mol. Wt. = 1100 |
| III. $E_{53\%}$ $P_{18\%}$ $ABA_{29\%}$ | Mol. wt. = 1750 |
| IV. $E_{39\%}$ $P_{37\%}$ $APA_{24\%}$ | Mol. wt. = 1150 |
| V. $E_{60\%}$ $P_{27\%}$ $BL_{13\%}$ | Mol. wt. = 3600 |
| VI. $E_{59\%}$ $P_{21\%}$ $AC_{20\%}$ | Mol. wt. = 1720, | wherein E = ethylene, P = propylene, AAA — acrylic acetic anhydride, IAA — itaconic acetic anhydride, ABA = acrylic butyric anhydride, APA = acrylic propionic anhydride, BL — beta-lactone pendant groups, and AC = acrylyl chloride.

The finishing agents, referred to as A, C, and D, are identified hereinbefore.

Example Number 1, and subsequent examples, are to be read as follows:

Ex. No. 1 was actually run twice, in each case with 0.17 wt. % pick-up of finishing agent type A, once with 1.7 wt. % pick-up of Polymer Extender I, and once with no extender. The oil- and water-repellent tests, as set out above, were performed on both samples, the extended sample appearing as Ext., and the non-extended sample as No Ext.

| Ex. No. | Fiber Type | Finishing Agent Wt. % Type | Finishing Agent Wt. % Pick-Up | Polymer Extender Wt. % Type | Polymer Extender Wt. % Pick-up | Cure Time (min.) | Cure Temp. (°C.) | Oil Repellency Ext. | Oil Repellency No Ext. | Spray Rating Ext. | Spray Rating No Ext. |
|---|---|---|---|---|---|---|---|---|---|---|---|
| 1 | 100% Wool | A | .17 | I | 1.7 | 3 | 140 | 6 | 3 | 90 | 70 |
| 2 | " | " | .17 | II | " | " | " | 7 | " | " | " |

-continued

| Ex. No. | Fiber Type | Finishing Agent Type | Wt. % Pick-Up | Polymer Extender Type | Wt. % Pick-up | Cure Time (min.) | Cure Temp. (°C.) | Oil Repellency Ext. | Oil Repellency No Ext. | Spray Rating Ext. | Spray Rating No Ext. |
|---|---|---|---|---|---|---|---|---|---|---|---|
| 3 | Wool Gabardine | " | .50 | I | .75 | " | 150 | 6 | 6 | 100 | 100 |
| 4 | " | " | .24 | " | " | " | " | " | " | " | " |
| 5 | " | " | .13 | " | " | " | " | " | 4 | 90 | 80 |
| 6 | " | " | .09 | " | " | " | " | 4 | 3 | " | " |
| 7 | " | C | .50 | " | " | " | " | 8 | 8 | 100 | 90 |
| 8 | " | " | .24 | " | " | " | " | " | 7 | 90 | 80 |
| 9 | " | " | .13 | " | " | " | " | 6 | 5 | 80 | 70 |
| 10 | " | " | .07 | " | " | " | " | 4 | 3 | 70–80 | " |
| 11 | 100% Cotton | " | .30 | " | 1.0 | " | " | 5 | 0 | 80 | " |
| 12 | " | " | " | " | 1.5 | " | " | " | " | " | " |
| 13 | " | " | " | " | 2.0 | " | " | " | " | " | " |
| 14 | " | " | " | IV | 1.0 | 5 | 140 | 6 | " | 100 | " |
| 15 | " | " | " | V | " | " | " | 5 | " | " | " |
| 16 | 100% Cotton | A | .23 | I | 1.0 | 3 | 150 | 4 | 2 | 100 | 80 |
| 17 | " | D | 1.1 | " | " | " | " | 6 | 5 | 80 | 50 |
| 18 | " | A | .19 | VI | 1.9 | 5 | 140 | 2 | 1 | not determined | |
| 19 | " | D | .55 | I | 1.0 | 3 | 150 | 3 | 1 | 80 | 50 |
| 20 | " | A | .55 | " | " | " | " | 6 | 5 | 90 | 80 |
| 21 | 70% Dacron/ 30% Wool | C | .27 | " | 4.0 | 5 | 140 | " | 4 | Spray Rating Not Determined | |
| 22 | 65% Cotton/ 35% Dacron | " | .26 | " | 1.9 | " | 140 | 4 | 1–2 | " | " |
| 23 | 100% Silk | " | .38 | " | 6.0 | 5 | 130 | 6 | 2 | " | " |
| 24 | " | " | .20 | " | 3.0 | " | " | 3 | 1 | " | " |
| 25 | 100% Dacron | " | .17 | " | 5.0 | " | 140 | 6 | 4 | " | " |
| 26 | " | A | .28 | II | 2.8 | " | " | 5 | 1 | " | " |
| 27 | 100% Nylon | C | .50 | I | 8.0 | " | " | 6 | 4 | " | " |
| 28 | " | A | .33 | II | 3.3 | " | " | " | 3 | " | " |
| 29 | 100% Dacron | " | .15 | VI | 1.5 | " | " | 5 | 3 | " | " |

EXPERIMENT 30

For comparison purposes an experiment was made to determine the extender activity, if any, of a high molecular weight ethylene-acrylic acetic anhydride copolymer. The anhydride copolymer was obtained by the reaction of an ethylene (80.5%)/acrylic acid (19.5%) copolymer, having a melt index of 6.9 as measured by ASTM-1238-65T(E), with acetyl chloride at 100°C at 1% solids in perchloroethylene.

Treatment of swatches (about 4 × 4 in.) of 80 × 80 cotton print cloth was by dipping into a 1% solution of the copolymer followed by pressing to a 50% wet pick-up to give a 1.3% add-on. The fabric was thoroughly dried prior to treatment with finishing agent type C. Various loadings of the polymeric fluorocarbon finishing agent were applied from perchloroethylene to treated and untreated cloth samples. Samples were run side-by-side with identical procedures and no extender activity was found in samples in which the anhydride copolymer was used.

| Anhydride Copolymer % Add-on | Type C Add-on | Type C % | Cure Temp. °C. | Cure Time Min. | Oil Repellency Rating, AATCC |
|---|---|---|---|---|---|
| 1.3 | 0.2 | 0.13 | 100 | 10 | 2 |
| 0 | 0.2 | 0.13 | 100 | 10 | 2 |
| 1.3 | 0.4 | 0.25 | 100 | 10 | 3 |
| 0 | 0.4 | 0.25 | 100 | 10 | 3 |
| 1.3 | 0.6 | 0.38 | 100 | 10 | 4 |
| 0 | 0.6 | 0.38 | 100 | 10 | 4 |
| 1.3 | 0.8 | 0.50 | 100 | 10 | 5 |
| 0 | 0.8 | 0.50 | 100 | 10 | 5 |
| 1.3 | 1.0 | 0.63 | 100 | 10 | 6 |
| 0 | 1.0 | 0.63 | 100 | 10 | 6 |
| 1.3 | 1.0 | 0.63 | 140 | 3 | 6 |
| 0 | 1.0 | 0.63 | 140 | 3 | 6 |
| 1.3 | 1.0 | 0.63 | 140 | 5 | 6 |
| 0 | 1.0 | 0.63 | 140 | 5 | 6 |
| 1.3 | 1.0 | 0.63 | 150 | 3 | 6 |
| 0 | 1.0 | 0.63 | 150 | 3 | 6 |

EXPERIMENT 31

For comparison purposes, and in accordance with the procedures of Experiment 30 above, the following ethylene/acrylic acetic anhydride copolymers were tested and the results are given below.

| Type | Copolymer % E | Copolymer % AAA | Mol. Wt. | Melt Flow by ASTM-1238-65T(E) | "Grease" Melt Flow* |
|---|---|---|---|---|---|
| VII | 62 | 38 | 1300 | too fluid** | 28 |
| VIII | 61 | 39 | 8700 | 1100 decigram/min. | 0.1 |

| Copolymer Type | % Add-on | Fluorochemical Type | % Add-on | Cure Temp. °C. | Cure Time Min. | Oil Repellency Rating, AATCC |
|---|---|---|---|---|---|---|
| VII | 1.3 | C | 0.38 | 100 | 10 | 6 |
| VIII | 1.3 | C | 0.38 | 100 | 10 | 4 |
| none | — | C | 0.38 | 100 | 10 | 4 |

*"Grease" Melt Flow is given as decigram/min. as measured by modifying ASTM-1238-65T(E) in the following manner: used 80°C instead of 190°C and used .02 inch orifice.
**"too fluid" means the polymer is too fluid at 190°C to be measured.

I claim:
1. A composition for improving the water- and/or oil-repellent properties of textiles which comprises an inert anhydrous solvent containing from about 0.1 to about 10 weight percent of a polymeric fluorocarbon finishing agent, and from about 0.3 to about 10 weight percent of one or more polyalkylene copolymer extenders of the formulae

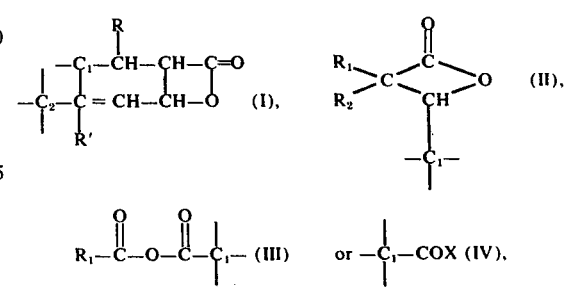

wherein $C_1$ and $C_2$ are, independently, carbon atoms of the polyalkylene chain represented by $+CH_2-CH_2+_n$; R and R' are, independently, hydrogen, an alkyl group of up to about 20 carbon atoms, phenyl, —COOH, or a segment of the polyalkylene chain; $R_1$ and $R_2$ are, independently, alkyl, aryl, aralkyl or alkaryl groups of up to about 20 carbon atoms, and X is a halogen, said polymeric extender having a molecular weight of from about 800 to about 8000.

2. The composition of claim 1 wherein the polymeric fluorocarbon concentration is from about 0.2 to about 3.0 weight percent.

3. The composition of claim 1 wherein the polymeric extender concentration is from about 0.5 to about 6 weight percent.

4. The composition of claim 1 wherein the solvent is perchloroethylene or 1,1,1-trichloroethane.

5. The composition of claim 1 wherein the molecular weight of the polymeric extender is from about 1000 to about 6000.

6. The composition of claim 1 wherein the polymeric extender is one or more of the following compounds Ethylene$_{(45-82\%)}$ Propylene$_{(0-40\%)}$ Acrylic Acetic Anhydride$_{(18-25\%)}$ Ethylene$_{(45-82\%)}$ Propylene$_{(0-40\%)}$ Methacrylic Acetic Anhydride$_{(18-25\%)}$ Ethylene$_{(15-79\%)}$ Propylene$_{(0-40\%)}$ Monoethylmaleate Maleic Acetic Anhydride$_{(20-30\%)}$ Ethylene$_{(45-82\%)}$ Propylene$_{(0-40\%)}$ Acrylyl Chloride$_{(10-25\%)}$.

* * * * *

UNITED STATES PATENT AND TRADEMARK OFFICE
CERTIFICATE OF CORRECTION

PATENT NO. : 3,997,500
DATED : December 14, 1976
INVENTOR(S) : Walter L. Vaughn

It is certified that error appears in the above-identified patent and that said Letters Patent are hereby corrected as shown below:

Col. 12, line 35, delete one A in the part of "$IAAA_{22\%}$".

Col. 16, line 10, "18" should be -- 13 --.

Signed and Sealed this

Nineteenth Day of April 1977

[SEAL]

Attest:

RUTH C. MASON
*Attesting Officer*

C. MARSHALL DANN
*Commissioner of Patents and Trademarks*